United States Patent
Sommer

(10) Patent No.: US 6,692,019 B2
(45) Date of Patent: Feb. 17, 2004

(54) METHOD TO CREATE INVISIBLE AIR BAG DEPLOYMENT PANEL

(75) Inventor: James John Sommer, Tipp City, OH (US)

(73) Assignee: Delphi Technologies, Inc., Troy, MI (US)

(*) Notice: Subject to any disclaimer, the term of this patent is extended or adjusted under 35 U.S.C. 154(b) by 91 days.

(21) Appl. No.: 09/805,491

(22) Filed: Mar. 13, 2001

(65) Prior Publication Data

US 2002/0130497 A1 Sep. 19, 2002

(51) Int. Cl.$^7$ ............................................... B60R 21/16
(52) U.S. Cl. ..................................... 280/732; 280/728.3
(58) Field of Search ............................. 280/732, 728.3, 280/743.1, 728.1; 428/43, 217

(56) References Cited

U.S. PATENT DOCUMENTS

| | | | |
|---|---|---|---|
| RE11,365 E | 9/1893 | Saltzkorn | |
| 3,622,176 A | 11/1971 | Byer | 280/150 |
| 3,794,349 A | 2/1974 | Fuller | 280/150 |
| 3,909,582 A | 9/1975 | Bowen | 219/121 |
| 3,965,328 A | 6/1976 | Locke | 219/121 |
| 4,148,503 A | 4/1979 | Shiratori et al. | 280/731 |
| 4,246,213 A | 1/1981 | Takamatsu et al. | 264/46.7 |
| 4,625,093 A | 11/1986 | Chryssolouris | 219/121 |
| 4,836,576 A | 6/1989 | Werner et al. | 280/731 |
| 4,852,907 A | 8/1989 | Shiraki et al. | 280/731 |
| 4,878,689 A | 11/1989 | Mitzkus et al. | 280/731 |
| 4,895,389 A | 1/1990 | Pack, Jr. | 280/732 |
| 5,080,393 A | 1/1992 | Dixon, Jr. et al. | 280/732 |
| 5,082,310 A | 1/1992 | Bauer | 280/732 |
| 5,222,760 A | * 6/1993 | Rafferty | 280/728.3 |
| 5,390,950 A | * 2/1995 | Barnes et al. | 280/728.3 |
| 5,698,283 A | * 12/1997 | Yamasaki et al. | 428/43 |
| 5,744,776 A | 4/1998 | Bauer | 219/121.7 |
| 5,797,619 A | 8/1998 | Bauer et al. | 280/728.3 |
| 5,839,752 A | * 11/1998 | Yamasaki et al. | 280/728.3 |
| 5,997,030 A | * 12/1999 | Hannert et al. | 280/728.3 |

* cited by examiner

Primary Examiner—Paul N. Dickson
Assistant Examiner—Faye M. Fleming
(74) Attorney, Agent, or Firm—Scott A. McBain

(57) ABSTRACT

A dash panel structure and method for forming such structure having an outer skin layer overlying a layer of foam cushioning material with a dimensionally stable support panel disposed below the foam cushioning material. A break-out pattern is applied across the surface of the substrate panel and into the overlying foam cushioning material in a pattern substantially corresponding to the desired deployment path of an underlying air bag cushion. The break-out pattern formed across the substrate panel is substantially aligned with a corresponding deployment opening pattern of grooved construction extending across the inner surface of the skin layer such that the deployment of the air bag cushion may be carried out at a controlled defined location within the dash panel structure.

6 Claims, 3 Drawing Sheets

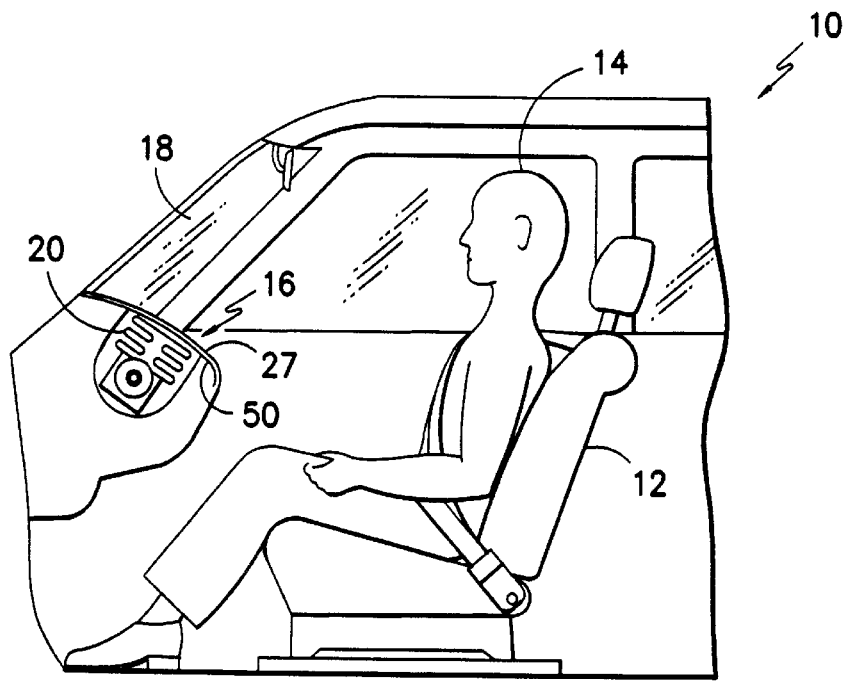
FIG. -1-
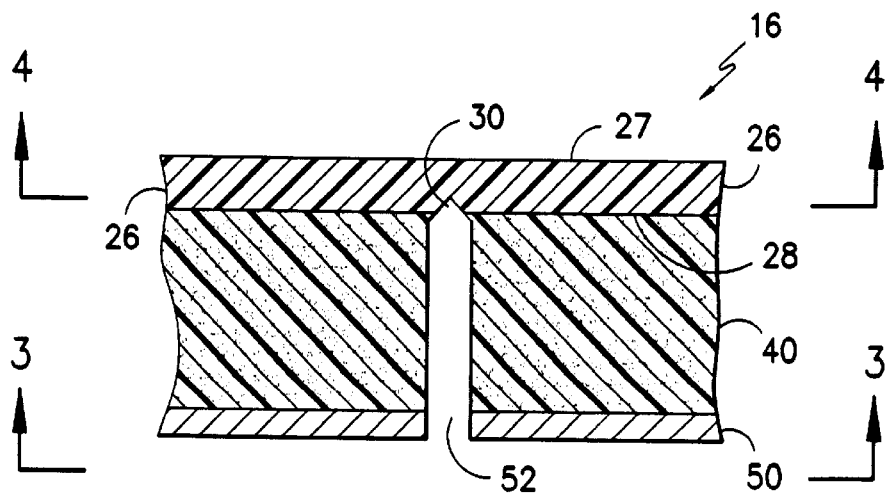
FIG. -2-

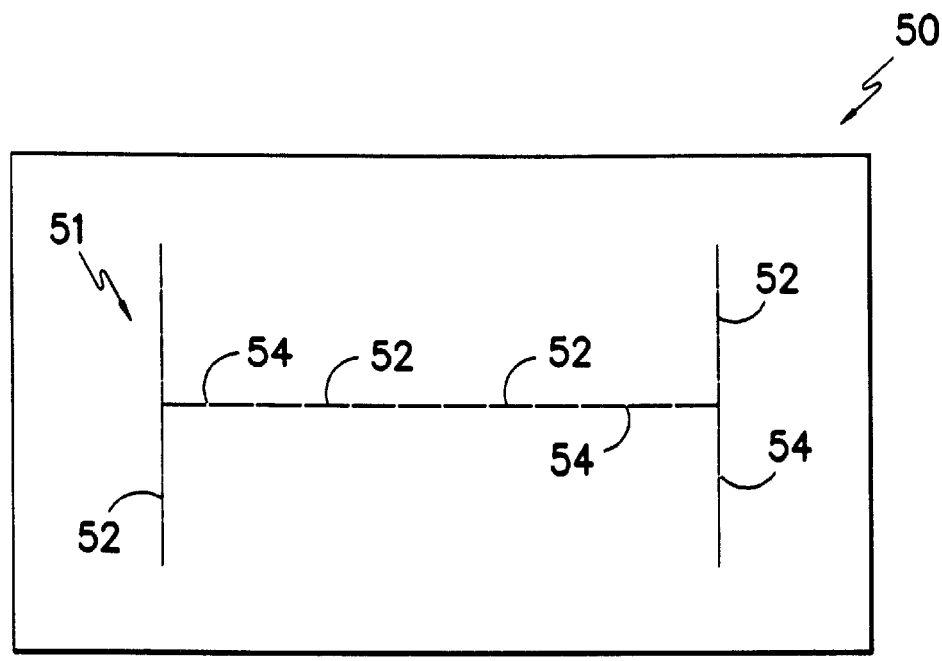
FIG. -3-
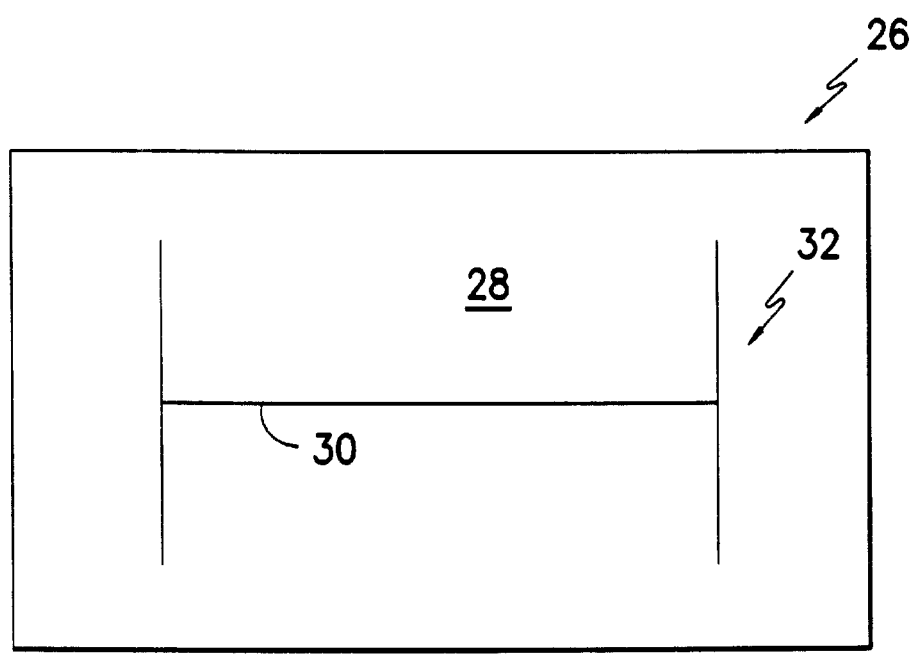
FIG. -4-

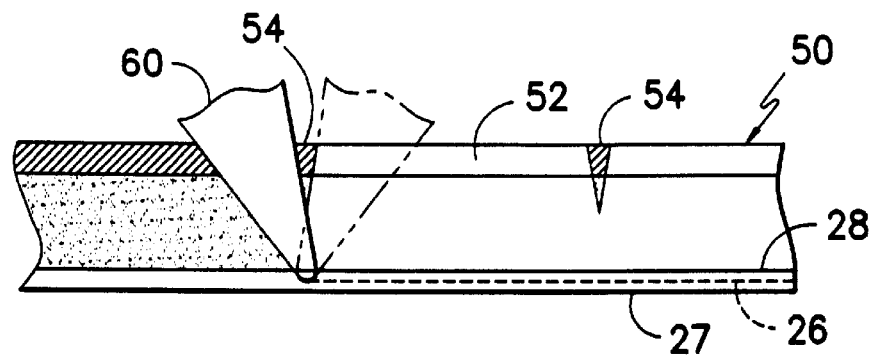
FIG. -5-
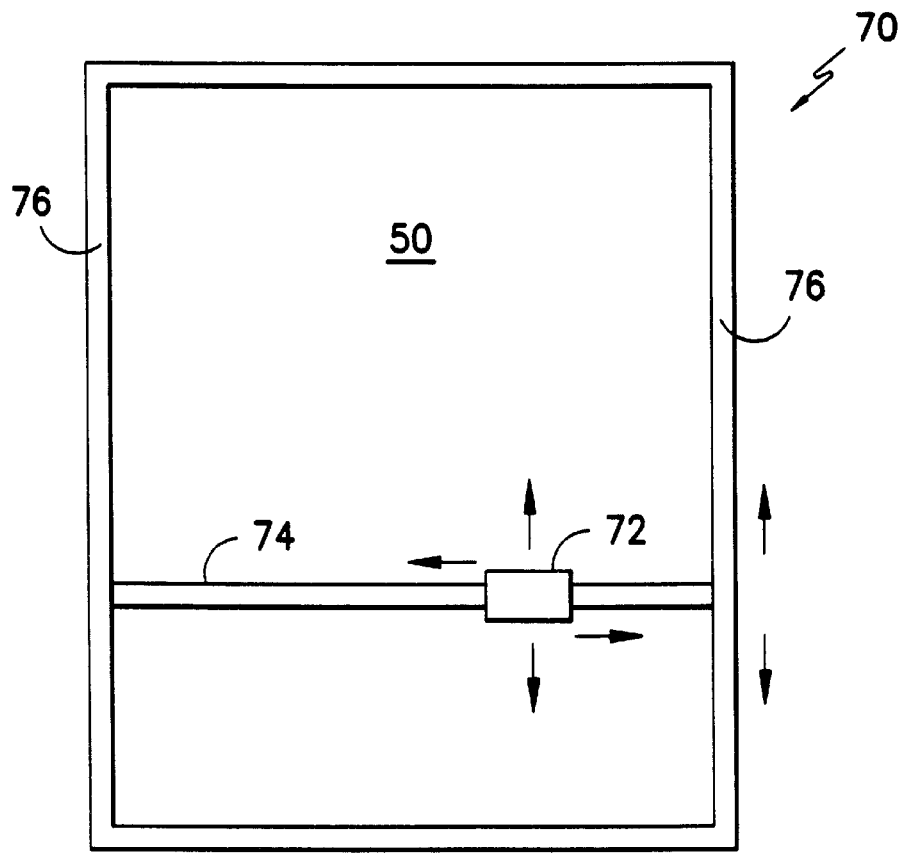
FIG. -6-

METHOD TO CREATE INVISIBLE AIR BAG DEPLOYMENT PANEL

TECHNICAL FIELD

This invention relates to a dash panel structure for an automobile including a deployment opening for an underlying inflatable air bag cushion. More particularly, the invention relates to a method of forming a deployment opening within a dash panel structure such that the deployment opening is not visible to an occupant viewing the exterior of the dash panel structure.

BACKGROUND OF THE INVENTION

It is well known in motor vehicles to provide an air bag module which includes an inflatable air bag cushion for the protection of a vehicle occupant in the event of a collision. The air bag module typically includes an inflator for discharging an inflation medium such as high pressure gas or the like into the air bag cushion upon the occurrence of a predetermined level of vehicle deceleration or other measurable vehicle condition.

Inflatable air bag cushions may be disposed at a number of locations within the vehicle so as to provide protection for the occupants therein during various collision events. In particular, it is known to utilize an inflatable air bag cushion stored within the hub of the steering wheel for protection of the operator of the vehicle and to utilize an inflatable air bag cushion deployable from the dash panel for protection of a passenger within the vehicle during a collision event. In order to facilitate the deployment of inflatable air bag cushions from the dash panel, it is known to incorporate a pattern across the surface of the dash panel which preferentially tears to form a defined deployment opening pattern across the surface of the dash panel as the air bag cushion is inflated. The creation of such a pattern across the surface of the dash panel typically leads to visible seams across the surface of the dash panel at the location of the deployment opening pattern. The presence of such visible seams may detract from the aesthetic character of the dash panel and may thus be viewed as undesirable by some users.

In order to address the desire to conceal the deployment opening pattern from the occupants within the vehicle, it has been proposed to cover the dash panel with an outer skin layer the underside of which is scored in a pattern corresponding to the desired deployment opening pattern and thereafter apply a layer of foam across the scored surface so as to provide a layer of continuous support to the scored surface. A substrate panel which may include deployment opening doors disposed over the inflatable air bag is provided beneath the foam support layer. As will be appreciated, such a construction requires the separate formation of the skin and the underlying support structure of the foam and substrate panel as well as a separate formation step for forming deployment opening doors within the substrate panel. Moreover, due to the fact that there are separately formed deployment opening patterns within the substrate panel and the outer skin which are separated by a substantially continuous layer of uninterrupted foam, the establishment of a substantially aligned opening pattern between the substrate panel and the skin may be difficult to achieve. The failure to establish a fully aligned opening pattern between the substrate panel and the skin may require the application of additional force by the air bag cushion in order to exit the dash panel.

SUMMARY OF THE INVENTION

The present invention provides advantages and alternatives over the prior art by providing a dash panel structure having a hidden deployment opening formed beneath the surface of the dash panel structure wherein a substrate panel is weakened in a desired pattern by cutting through the substrate panel and at least partially into the foam or other cushioning material overlying the substrate panel in a pattern substantially corresponding to a deployment opening pattern of grooved construction extending across the inner surface of a skin layer at the exterior of the dash panel structure. The patterned weakening of the substrate panel and overlying foam corresponding to the deployment opening pattern in the skin permits the efficient deployment of an underlying air bag without the application of undue force. Moreover, due to the fact that the foam is also at least partially cut, foam fragmentation is reduced which is believed to substantially prevent the potentially undesired outward projection of foam fragments during deployment of the air bag.

These advantages are accomplished in a potentially preferred form of the invention by providing a dash panel structure having an outer skin layer overlying a layer of foam cushioning material with a dimensionally stable support panel disposed below the cushioning material. A break-out pattern of slotted configuration is applied across the surface of the substrate panel and at least partially into the overlying foam in a pattern substantially corresponding to the desired deployment path of an underlying air bag cushion. The break-out pattern formed across the substrate panel is substantially aligned with a corresponding deployment opening pattern of grooved construction extending across the inner surface of the skin layer such that the deployment of the air bag cushion may be carried out at a controlled defined location within the dash panel structure.

According to a potentially preferred feature of the present invention, it is contemplated that the deployment opening pattern across the inner surface of the skin layer may be formed simultaneously with the formation of the break-out pattern across the support panel using a single cutting operation.

In accordance with another potentially preferred aspect of the present invention, it is contemplated that the deployment opening pattern across the skin layer may be substantially continuous in character while the break-out pattern across the substrate panel may be formed from a plurality of slots separated one from the other by uncut tabs. It is further contemplated that the continuous groove across the inner surface of the skin layer may be formed simultaneously with the slots across the substrate panel by use of a variable angle material removal device.

According to yet a further feature of the present invention, it is contemplated that the deployment opening pattern across the skin layer may be formed separately from the formation of the break-out pattern across the substrate panel and foam layer.

BRIEF DESCRIPTION OF THE DRAWINGS

The accompanying drawings, which are incorporated in and constitute a part of this specification, illustrate potentially preferred embodiments and practices of the present invention and, together with the general description of the invention given above and the detailed description set forth below, serve to explain the principles of the invention wherein:

FIG. 1 shows the interior of an automotive vehicle including a dash panel structure in overlying relation to an inflatable air bag;

FIG. 2 is a representative cross-sectional view taken through the dash panel structure of FIG. 1 at the location of a deployment opening pattern overlying the inflatable air bag;

FIG. 3 is a plan view taken along line 3—3 in FIG. 2 illustrating a break-out pattern of segmented construction extending across a substrate support panel within the dash panel of FIG. 1;

FIG. 4 is a plan view taken generally along line 4—4 of FIG. 2 illustrating a deployment opening pattern of substantially continuous grooved construction extending across the inner surface of a skin layer forming the exterior of the dash panel structure of FIG. 1;

FIG. 5 illustrates the simultaneous formation of the segmented break-out pattern of FIG. 3 and the substantially continuous deployment opening pattern in FIG. 4 utilizing an adjustable angle material removal element in the robotic material removal device; and FIG. 6 is a representative illustration of a robotic material removal device for use in practice of the present invention.

While the invention has been illustrated and generally described above and will hereinafter be described in connection with certain potentially preferred embodiments and procedures, it is to be understood that in no event is the invention to be limited to such illustrated and described embodiments and procedures. On the contrary, it is intended that the present invention shall extend to all alternatives and modifications to the illustrated and described embodiments and procedures as may embrace the broad principles of this invention within the true spirit and scope thereof.

DESCRIPTION OF THE PREFERRED EMBODIMENT

Turning now to the drawings, wherein to the extent possible like reference numerals are utilized to designate like components throughout the various views, in FIG. 1 it is seen that a vehicle 10 may include a seating structure 12 which supports an occupant 14 in generally opposing relation to a dash panel 16 extending below a windshield 18. An inflatable air bag cushion 20 is housed within the dash panel 16 for outward deployment through the surface of the dash panel 16 towards the occupant 14.

As best illustrated in FIG. 2, in the region overlying the air bag cushion 20 the dash panel 16 is preferably of a multi-layered construction. This multi-layered construction preferably includes an outer skin layer 26 having a substantially smooth outer surface 27 and an underside 28 facing away from the outer surface 27. As will be discussed further hereinafter, the underside 28 of the outer skin layer 26 includes a groove 30 to reduce the thickness of the outer skin layer 26 to a substantially uniform level in a localized deployment opening pattern in the region overlying the air bag cushion 20. Such a reduction in thickness provides a preferential weakening of the outer skin layer 26 along the groove 30 so as to promote the localized well defined fracture of the outer layer 26 along the pattern formed by the groove 30 as the air bag cushion 20 is inflated.

The outer skin layer 26 is preferably formed of a plastic material of substantial flexibility and aesthetically pleasing character. Due to the fact that the groove 30 extends only partially into the underside 28 of the outer skin layer 26, the presence of the deployment pattern formed by the groove 30 is substantially invisible to the occupant 14 when viewing the outer surface 27. Thus, the aesthetic benefits of the outer skin layer 26 are not sacrificed.

In order to provide the dash panel 16 with structural support, a layer of cushioning support material 40 is provided in the region below the outer skin layer 26. It is contemplated that the cushioning support material 40 may be of any number of different constructions although a foamed material such as a urethane foam may be potentially preferred. A substrate panel 50 of dimensionally stable plastic or other suitable material is preferably disposed below the cushioning support material. According to the potentially preferred embodiment, the cushioning support material 40 and the substrate panel 50 thus serve cooperatively to provide a support structure for the outer skin layer 26.

As illustrated in FIG. 3, the substrate panel is preferably provided with a break-out pattern 51 formed by the removal of material across the substrate panel 50 and at least partially into the cushioning support material 40. According to a potentially preferred practice, the break-out pattern 51 is made up of a plurality of slots 52 which are formed so as to extend substantially across the layer of cushioning support material 40 and partially into the outer skin layer 26 such that the slots 52 terminate in formation of the groove 30 across the underside 28 of the outer skin layer 26. According to the illustrated and potentially preferred practice of the present invention, the slots 52 are separated by short uncut tabs 54 so as to maintain the substantial stability of the substrate panel 50 prior to deployment of the air bag cushion 20. By way of example only, and not limitation, it is contemplated that the length of the slots 52 will preferably be in the range of about 10 times the length of the uncut tabs 54. The short length of the uncut tabs 54 relative to the slots 52 is believed to promote the substantial concentration of energy at the tabs 54 when the air bag is deployed and presses against the substrate panel 50. This concentration of energy across the short tabs 54 is believed to promote the controlled fracture of the substrate panel 50 along the break-out pattern 51 thereby opening a path of egress for the air bag cushion 20 as inflation takes place.

As best illustrated through reference to FIG. 4, the ability of the air bag cushion 20 to exit cleanly through the dash panel 16 is preferably enhanced by the presence of a deployment opening pattern 32 formed by the groove 30 across the underside 28 of the outer skin layer 26. As shown, the groove 30 which forms the deployment opening pattern 32 is preferably of a substantially continuous nonsegmented arrangement so as to promote the smooth and uniform fracture of the outer skin layer 26 along the deployment opening pattern 32. As further shown, the size and shape of the deployment opening pattern 32 will preferably correspond substantially to the size and shape of the break-out pattern 51 extending across the substrate panel 50. Such correspondence is believed to promote the establishment of a well defined path of egress extending through the layers of material forming the dash panel 16 in a localized defined pattern substantially corresponding to the deployment opening pattern 32 across the underside 28 of the outer skin layer 26 as the air bag cushion 20 applies pressure during deployment.

According to one potentially preferred practice, it is contemplated that a break-out pattern of slots 52 and uncut tabs 54 extending across the substrate panel 50 may be formed simultaneously with the introduction of the groove 30 forming the deployment opening pattern 32 across the underside 28 of the outer skin layer 26. In particular, it is contemplated that such simultaneous formation may be carried out by the use of an ultrasonically actuated blade element 60 (FIG. 5) or other appropriate material removal device which cuts across the substrate panel 50 and the cushioning support material 40 and partially into the outer skin layer 26 as illustrated in FIG. 5.

As best illustrated in FIG. 6, it is contemplated that the blade element 60 may be conveyed by a robotic conveyance device 70 across the substrate panel 50 along virtually any pattern as may be desired. In particular, it is contemplated that the blade element 60 may be carried on a head 72 which may move along a cross bar element 74. The cross bar element 74 may in turn move along lateral tracks 76 such that the combination of movement of the head 72 and cross bar 74 permits the movement of a blade element 60 supported within the head 72 along substantially any desired pattern relative to the underlying substrate panel 50. Moreover, the blade element 60 which is carried on the head 72 is preferably at least partially rotatable such that the blade element 60 may be brought into and out of contact with the substrate panel 50 and such that the angle of the blade element 60 may be adjusted relative to the substrate panel 50 and the adjacent cushioning support material 40 and outer skin layer 26 during the material removal operation. One such robotically controlled material removal device which is believed to be suitable is the Model U.S. 50 which is believed to be available from American GFM having a place of business in Chesapeake, Va.

It is contemplated that a urethane foam forming the cushioning support material 40 may be blown between the outer skin layer 26 and the substrate panel 50 so as to form a multi-layered composite structure of a form substantially as illustrated in FIG. 2. It is also contemplated that the cushioning material 40 may be attached to the outer skin layer 26 in a preliminary cladding operation so as to form a preliminary layered composite which may thereafter be applied across any substrate panel 50 as may be utilized.

As illustrated through reference to FIGS. 5 and 6, according to the potentially preferred practice once the desired composite is formed, an ultrasonically actuated vibrating blade element operated at approximately 20 KHz with an amplitude of 0.001 inches is brought into contact with the substrate panel 50 and passed through the cushioning support material 40 and partially into the outer skin layer 26. As the head 72 carrying the blade element 60 moves across the substrate panel 50, the blade element 60 is moved in a sweeping action to remove the material below the slots 52 along the break-out pattern as well as material between the outer skin layer 26 and the uncut tabs 54. As illustrated, the blade element 60 is periodically withdrawn from the layered composite and reinserted in a complementary angled relation so as to form the uncut tabs 54 while nonetheless forming a continuous groove along the underside 28 of the outer skin layer 26. This action is performed on a repeating basis as the blade element 60 is moved along the desired pattern. The ultrasonic actuation of the blade provides a localized heating of the material being removed as it comes into contact with the blade thereby allowing all material to be removed without requiring substantial force on the part of the blade element. Moreover, due to the fact that the blade is fully adjustable, the depth of the material removal across the outer skin layer 26 may be adjusted such that there is a substantially constant thickness of remaining material overlying the groove 30 forming the break-out pattern 32. The present invention can thus be seen to provide a highly accurate and controllable method for establishing a deployment opening across a multi layered dash panel structure.

It is to be understood that a person skilled in the art may make modifications to the preferred practices shown herein. By way of example, although the use of a single material removal procedure to form both the breakout pattern across the substrate panel 50 and the deployment opening pattern 32 across the underside of the outer skin layer 26 is preferred, it is nonetheless contemplated that such operations may be performed separately. In such a practice, the outer skin layer 26 is formed and thereafter scored utilizing the blade element 60 or other appropriate device so as to leave a substantially uniform thickness of material overlying a weakened groove 30, the scored outer skin layer 26 is thereafter applied over a foam layer or other suitable cushioning support material 40 and a suitable substrate panel 50 to form a layered composite. A second material removal operation may thereafter be commenced from the underside of the substrate panel 50 so as to cut through the substrate panel 50 and at least partially into the cushioning support material 40 so as to form a weakened break-out pattern. The weakened break-out pattern preferably corresponds substantially to the deployment opening pattern formed across the underside of the outer skin layer 26 during the initial scoring operation such that upon application of pressure by the air bag cushion 20 a localized defined deployment opening is formed across the layers of the dash panel 16.

While the present invention has been illustrated and described in relation to potentially preferred embodiments and practices, it is to be understood that such embodiments and practices are illustrative only and that the present invention is in no event to be limited thereto. Rather, it is contemplated that modifications and variations to the present invention will no doubt occur to those of skill in the art upon reading the above description and/or through a practice of the invention. It is therefore contemplated and intended that the present invention shall extend to all such modifications and variations which incorporate the broad aspects of the present invention within the full spirit and scope of the following claims and all equivalents thereto.

What is claimed is:

1. A method for forming an air bag deployment opening at a location within a vehicle dash panel structure overlying an inflatable air bag cushion such that the location of the deployment opening is substantially hidden from the view of an occupant viewing the exterior of the dash panel structure, wherein the dash panel structure comprises an outer skin layer having an outer show surface forming the exterior of the dash panel structure and an interior surface facing away from the outer show surface, the dash panel structure further comprising an underlying support structure including a layer of foam disposed beneath the interior surface of the outer skin layer and a substrate panel disposed beneath the foam intermediate the interior surface of the outer skin layer and the inflatable air bag cushion, the method comprising the steps of:

applying a deployment opening pattern of grooved construction across the interior surface of the outer skin layer;

joining the outer skin layer to the underlying support structure such that the interior surface of the outer skin layer is disposed in substantially opposing relation to the underlying support structure; and removing at least a portion of the material forming the underlying support structure in a pattern of slots extending through the substrate panel and at least partially into the foam, wherein the pattern of slots is substantially aligned with the deployment opening pattern across the interior surface of the outer skin layer such that upon inflation of the air bag cushion the dash panel structure is opened through the outer skin layer and the underlying support structure in a pattern substantially corresponding to the deployment opening pattern across the interior surface of the outer skin layer and wherein the deployment opening pattern across the interior surface comprises at least one elongate groove segment having a length greater than the slots extending through the substrate panel aligned with said at least one elongate groove segment.

2. The invention according to claim 1, wherein the substrate panel comprises a substantially rigid plastic material.

3. The invention according to claim 1, wherein the step of applying a deployment opening pattern of grooved construction across the interior surface of the outer skin layer is conducted such that a substantially uniform thickness of material is retained within the outer akin layer in overlying relation to the deployment opening pattern.

4. The invention according to claim 3, wherein the step of applying a deployment opening pattern of grooved construction across the interior surface of the outer skin layer is performed concurrently with the step of removing at least a portion of the material forming the underlying support structure in a pattern of slots extending through the substrate panel.

5. The invention according to claim 4, wherein a vibrating element is used to concurrently apply the deployment opening pattern of grooved construction across the interior surface of the outer skin layer and to remove material forming the underlying support structure in a pattern substantially aligned with the deployment opening pattern.

6. The invention According to claim 5, wherein the vibrating element is adjustable to various angles such that the vibrating element maybe swept in a substantially fanning action across the interior surface of to outer skin layer and through the material forming the underlying support structure so as to form a substantially continuous deployment opening pattern of grooved construction extending across the interior surface of the outer skin layer in substantial alignment with the pattern of slots within the substrate panel.

* * * * *